(12) United States Patent
Batcho

(10) Patent No.: US 6,186,445 B1
(45) Date of Patent: Feb. 13, 2001

(54) METHOD AND APPARATUS FOR MITIGATING JUNCTION FLOWS

(76) Inventor: Paul F. Batcho, 12 Humbert St., Princeton, NJ (US) 08540

(*) Notice: Under 35 U.S.C. 154(b), the term of this patent shall be extended for 0 days.

(21) Appl. No.: 09/263,592

(22) Filed: Mar. 5, 1999

Related U.S. Application Data

(60) Provisional application No. 60/077,103, filed on Mar. 6, 1998.

(51) Int. Cl.[7] .................................................. B64C 23/06
(52) U.S. Cl. .......................................... 244/130; 244/199
(58) Field of Search ................................... 244/199, 130; 138/37–38; 52/84

(56) References Cited

U.S. PATENT DOCUMENTS

| | | | |
|---|---|---|---|
| 2,650,752 | * 9/1953 | Hoadley | 244/130 |
| 3,101,920 | * 8/1963 | Fradenburgh | 244/130 |
| 4,569,494 | * 2/1986 | Sakata | 244/199 |
| 5,772,155 | * 6/1998 | Nowak | 244/199 |

OTHER PUBLICATIONS

Williams et al, "A Comprehensive Plan for Helicopter Drag Reduction", The American Helicopter Society, May 1975.*

* cited by examiner

Primary Examiner—Galen L. Barefoot
(74) Attorney, Agent, or Firm—Mathews, Collins, Shepherd & Gould, P.A.

(57) ABSTRACT

An apparatus and method for mitigating the formation of the necklace vortex in junction flows is disclosed. A lifting structure for inducing a positive lift vector and having at least one tip for inducing an outward flow is placed ahead of the windward side of an obstacle at which a necklace vortex would be formed. The structure has a bottom surface and is placed above the boundary floor plane (e.g., a plane from which the obstacle protrudes), by a sufficient distance to allow a flowfield to travel between the bottom surface of the structure and the floor plane. Exemplary applications for the invention include reducing scouring at bridges and bridge-like piers or supports, reducing acoustic signature of submarine operations, protecting architectural structures and reducing wind gusts, mitigating wind hazards for geological structures, and enhancing performance of aircraft.

21 Claims, 6 Drawing Sheets

METHOD AND APPARATUS FOR MITIGATING JUNCTION FLOWS

RELATED APPLICATIONS

Applicant claims priority based upon U.S. Pat. application Ser. No. 60/077,103 filed Mar. 6, 1998.

FIELD OF THE INVENTION

The invention relates to a method and apparatus for mitigating junction flows, and in particular, to a method and apparatus for reducing the effects of the necklace vortex on objects comprising bridges, piers, buildings, aircraft, submarines, and other architectural and geological structures.

BACKGROUND OF THE INVENTION

The hydrodynamics associated with the flow of air, water, or any fluid at the junction of two surfaces is common to many engineering and natural structures. At the junction of two solid surfaces, a highly unsteady and turbulent flowfield is established when a fluid flowing over a surface encounters an obstacle. See R. L. Panton, *Incompressible Flow*, (John Wiley & Sons 1984), which is hereby incorporated by reference. This fluid dynamic phenomenon (e.g., the unsteady and turbulent flowfield), has been referred to in the field as the horseshoe vortex or the necklace vortex, and for consistency of reference, the term "necklace vortex" will be used herein which is intended to broadly encompass the phenomenon.

Occurrences of the necklace vortex are found in many manmade and naturally occurring circumstances and can have adverse and hazardous effects from its presence. For example, the necklace vortex can be found at the river floor junction with a bridge pier, the junction of a submarine hull and its sailplanes, the windward side of an architectural structure such as a building, the junction of inlet struts in hydrodynamic inlets such as in airbreathing engines and intake systems of industrial power plants, the junction of rotor and stator blades in turbines and compressors, the junctions of an aircraft fuselage body and wing, and in large scale geological flows at the foot of hills, mountains, and volcanoes. In each case the necklace vortex may cause adverse effects, some of which are discussed below. See also Bushnell, AERONAUTICAL JOURNAL, *"Longitudinal Vortex Control—Techniques and Applications"* (October 1992), at pp. 293–312.

Bridge Pier Erosion

The floor of rivers are typically composed of soil that can be transported by various shearing and mixing forces associated with the local flow of the river. The necklace vortex that forms at bridge supports and piers causes highly unsteady fluid mixing at the windward side and adjacent side regions of these obstacles. This unsteady flow causes erosion not only of the piers and supports but also of the adjacent riverbed, and sediment from the soil is forced into the river flow near the floor and then carried downstream. This event is known as scouring and can cause severe degradation of bridge foundations, ultimately leading to bridge failure and collapse. This degradation of bridge structural support has long been recognized as a leading issue in public safety, and it is estimated that damages from scouring are responsible for up to 100 million dollars in the United States each year. Thousands of bridges in the United States and abroad are known to be "scour critical." See Rhodes and Trent, *"Economics of Floods, Scour, and Bridge Failures,"* Proceedings of the ASCE 1993 National Conference on Hydraulics Engineering, Vol. I, San Francisco, Calif. (Jul. 25–30 1993), at pp. 928–933; Young, *"Risk Cost for Scour at Unknown Foundations,"* Proceedings of the ASCE Water Forum '92, Baltimore, Md. (August 1992), and *"National Bridges Inventory Data,"* U.S. Dept. of Transportation, Federal Highway Admin., Office of Engineering, Bridge Division (1992), all of which are incorporated herein by reference.

Submarine Flowfields

The hull of a typical attack submarine is on the order of several hundred feet or more, and boundary layers of sizable extent develop along the surface of the hull. The various control surfaces that intersect the hull (e.g., submarine sail), cause a necklace vortex flow to form, and this localized vortical flow can be ingested into the propeller, particularly for the rearward control surfaces. This ingestion of the necklace vortex flow may produce acoustic noise and degrade stealth characteristics of submarine operations.

Architectural Aerodynamics

Pressure systems and localized wind gusts have long been a problem for architectural designs for outdoor cafes and meeting areas. When structures are subjected to oncoming air flows, unanticipated localized wind gusts may occur which are a problem for local pedestrian traffic and exterior design features.

When unobstructed wind travels over the ground, the speed of the wind is much lower at ground; in fact, the theoretical boundary conditions or no-slip condition states the speed is zero at the ground. The speed increases from the ground surface to above the ground, e.g., from zero at the ground to the freestream value of the wind far above the ground. This fluid mechanic event is known as the boundary layer which can be several tens or hundreds of feet high (e.g., the height of the layer from the ground to the point where the wind travels at the freestream value can be tens or hundreds of feet). When wind impacts the side of a building, a necklace vortex is formed, and the high energy flow in the upper part of the boundary layer is forced toward the ground. The necklace vortex can cause unsteady gusts of air near the ground which, among other things, are a problem for pedestrian comfort and functionality of exterior designs.

Large Scale Geological Flows

The occurrence of a necklace vortex system can be found at the foot of the windward side of mountains, hills, volcanoes or other geological or naturally-occurring obstacles. As discussed above, the necklace vortex is responsible for dragging high energy air flows from the upper part of the boundary layer to the ground level. In geological flows, these boundary layers can be several hundred feet high, and the necklace vortex can force atmospheric pollutants to the ground and create adverse health hazards for the public and wildlife, in addition to causing adverse wind conditions.

Aircraft Wing/Body Junctions, Inlet Struts, Rotor and Stator Blade Junctions

Aerodynamic shaped surfaces may be in contact with a surface having an engineering function. A necklace vortex system may be formed at wing/body junctions, engine inlets, and internal engine components which can be ingested into engines, thus degrading engine performance or, in some severe conditions, causing engine stall. The formation of necklace vortex systems are also responsible for drag penalties on aircraft as well as submarines.

Previous attempts at mitigating the effects of the necklace vortex have applied the intuitive approach of adding positive and negative vorticities to obtain zero. Structures such as strakes, fillets, dillets, and triangular-shaped ramp plates have been used to mitigate the necklace vortex Other efforts have included using staked washers, or large rocks placed around the pier (riprap), or vertical guide vanes protruding from the riverbed. See Richardson, Harrison, and Davis, "*Evaluating Scour at Bridges*," FHWA-IP-90-017, Hydraulic Engineering Circular No. 18, (February 1991) (incorporated by reference). None of these approaches have proven to be of significant long-term help in mitigating the scouring problem and adverse affects of the necklace vortex.

Structural retrofits have been suggested for other reasons. For example, U.S. Pat. No. 5,478,167 to Oppenheimer et al., "*Buoyant Matter Diverting System*," discloses a device placed in front of a structure to protect the structure by deflecting floating debris away from it. The device of Oppenheimer has a surface that is inclined to produce a negative lift and a wake downstream of the device and in front of the obstacle, with the downstream wake causing floating debris (e.g., ice, logs, trees, etc.), to deflect away from the structure (col. 3, 1. 40–50). The Oppenheimer patent does not address the necklace vortex or provide insight into floor physics or scour.

Thus, there is a need to reduce the effect of the necklace vortex on objects such as bridges, bridge-like piers and supports, submarines, architectural structures, aircraft, geological features, and other obstacles affected by the vortex.

SUMMARY OF THE INVENTION

Applicant has discovered that adverse effects of the necklace vortex can be mitigated by introducing a surface inducing an upward lift vector in front of an obstacle being protected and above the floor or reference plane. This invention applies counter-intuitive approaches, in that a tip vortex is introduced of the same rotational sense as the necklace vortex and the vortex is addressed in an upper flowfield. Summarily described, the invention embraces a method of reducing the effect of a necklace vortex generated when a flowfield contacts the side of an obstacle. The obstacle will have a certain thickness defining at least one free space region and will protrude above a reference plane. The method comprises placing a winged device in front of the obstacle and above the reference plane (e.g., in an upper flowfield), for directing the flowfield away from the thickness of the obstacle toward the at least one free space region and for inducing velocity in the flowfield adjacent the free space region. Applicant has discovered that the necklace vortex can be reduced by relieving the spanwise gradients of the flowfield at the windward nose region of the obstacle, thereby reducing the amount of vortex stretching.

The invention also comprises an apparatus for reducing the necklace vortex comprising a winged device for placement in front of the windward side of the obstacle and above the reference plane on which the obstacle may reside or be suspended. The winged device has a surface for inducing an upward lift vector and a flowfield modification for directing the flowfield in an outwardly direction (e.g., away from the center of the obstacle). The inventive method and apparatus mitigate the necklace vortex and allow fluid to flow around the obstacle in a less disrupted way.

BRIEF DESCRIPTION OF THE DRAWINGS

For a better understanding of the invention, an exemplary embodiment is described below, considered together with the accompanying drawings, in which:

FIGS. 4A–4D schematically illustrate top, front, and side views of the inventive apparatus of FIGS. 1 and 2, wherein;

FIG. 4A reflects a top view of the embodiment of FIGS. 1B–1C;

FIG. 4B reflects a top view of the embodiment of FIG. 2;

FIG. 4C reflects a front view of the embodiment of FIGS. 1B–1C;

FIG. 4D reflects a side view of the embodiment of FIGS. 1B–1C;

FIG. 4E reflects a perpective view showing an alternative placement of the inventive apparatus;

FIGS. 6C–6D are side and front views, respectively, illustrating the tip vortex generated with the invention;

DETAILED DESCRIPTION OF THE INVENTION

The inventive method and apparatus mitigates the formation of the necklace vortex injunction flows. The inventive apparatus may be embodied in a winged device comprising at least one tip (usually two tips) and a lifting structure having a bottom surface, wherein the structure induces an upward positive lift (lift vector points away from the "floor plane" or "reference plane"). The upward positive lift induced by the lifting structure is associated with the net effect of the surface of the structure, e.g., its upper and bottom surfaces. The winged device is placed ahead of the side of an obstacle at which a necklace vortex is formed. The device is positioned near to and above the floor plane by a sufficient distance to allow a flowfield to travel between the bottom surface and the floor plane. The at least one tip directs the flowfield in an outwardly direction away from the obstacle. The inventive winged device has been named the "BAT WING,™" and it will be so referenced herein.

Figure 1A:
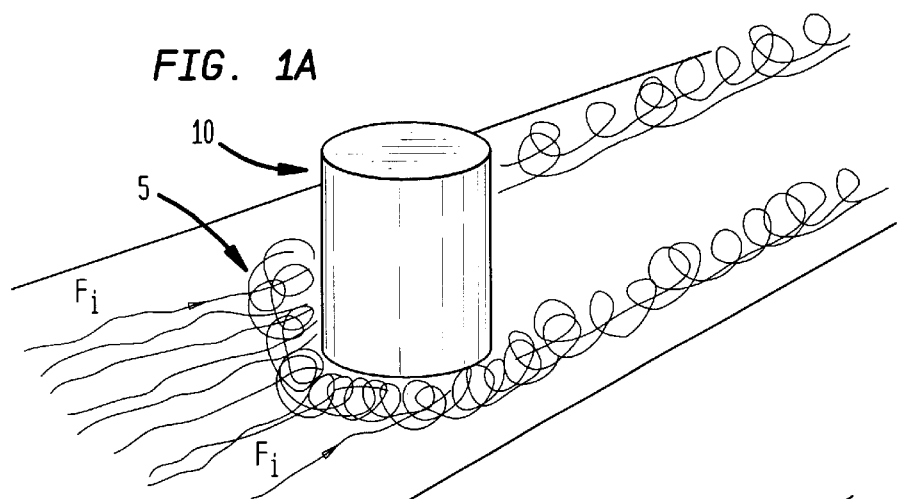
FIG. 1A schematically illustrates a perspective view of the necklace vortex formed when a flowfield encounters an obstacle.
Figure 1B:
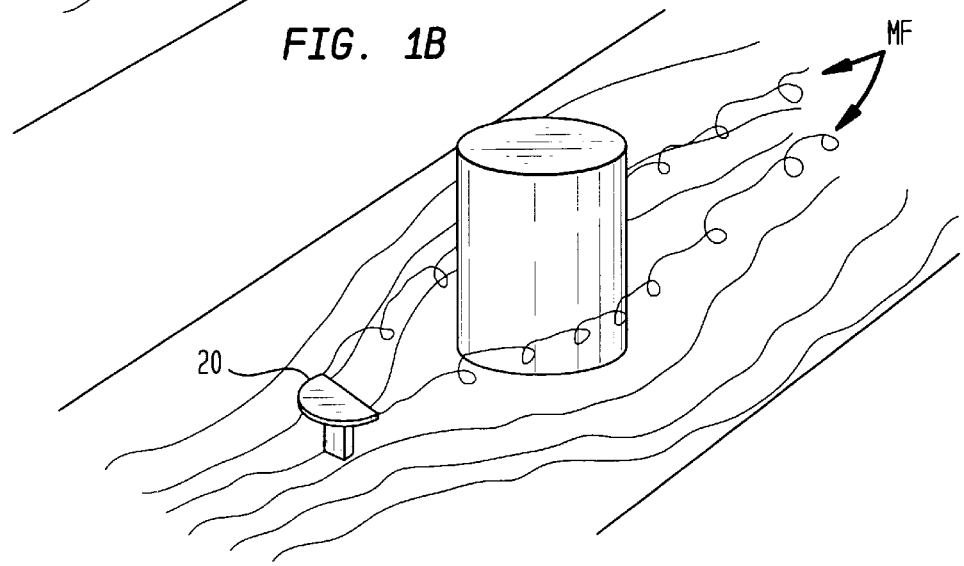
FIG. 1B schematically illustrates a perspective view of the mitigating effects of the invention onn the necklace vortex (e.g., as compared with FIG. 1A)

With reference to the figures, FIG. 1A schematically illustrates a perspective view of the necklace vortex 5 that is formed when a flowfield "$F_i$" contacts a side of an obstacle 10, and FIG. 1B schematically illustrates the mitigating effects of the inventive BAT WING™ on the necklace vortex. As can be seen in FIG. 1B, with the BAT WING™ 20, the incoming flowfield "$F_1$" upon encountering the wing 20 is directed away from the obstacle 10, producing a modified flowfield "MF." In FIG. 1C, there is shown a perspective view of the invention, without the necklace vortex, to illustrate further details of the BAT WING™ and its operation.

Figure 1C:
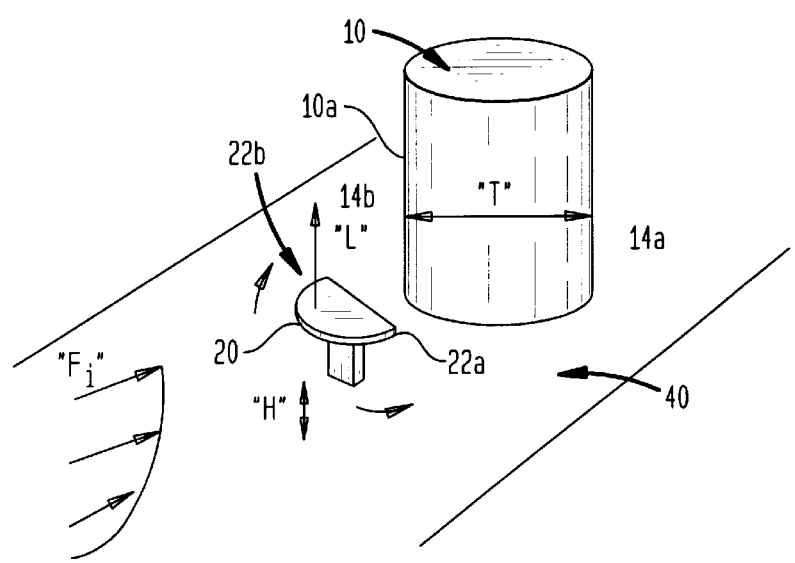
FIG. 1C schematically illustrates a perspective view of one embodiment of the inventive method and apparatus.

Referring to FIG. 1C, the invention will mitigate the effect of the necklace vortex generated when a flowfield "$F_1$" contacts the windward side 10a of an obstacle 10. The obstacle 10 has a certain thickness "T" defining at least one free space region 14a beyond the thickness. The obstacle 10 is shown schematically in FIGS. 1A–1C as a cylinder, although it is contemplated that it may comprise any obstacle obstructing a flowfield at which a necklace vortex may be formed, including a building, bridge or pier support, airplane wing, submarine sail, geological feature, and so forth. The obstacle will in any case protrude above a bottom reference plane or floor plane 40. Although the term "floor plane" is used to described this reference point, it of course should be understood that the term "floor" is not necessarily being used in its conventional sense, as this reference plane may comprise, among other things, the side of an airplane from which a wing projects or the hull of a submarine, and in the case of bridge piers, a local scour hole may exist around the pier. Thus, "floor plane" or "floor" as used herein does not imply a flat surface. In a theoretical sense, the reference plane, floor, or floor plane can be viewed as the plane at which a physical boundary is introduced onto the flow. This boundary may be in relative motion itself, such as is the case with riverbeds where sandbars are formed from the hydrodynamic forces on the sand that is dragged along in the direction of the motion of the flow.

Referring still to FIG. 1C, the obstacle 10 projects from the floor plane 40 and has a certain thickness "T" which defines at least one free space region 14a toward which the flowfield "$F_1$" will travel upon hitting the obstacle. Typically as shown in FIG. 1C, there will be two free space regions 14a, 14b, on either side of the obstacle. However, in some cases there will be only one free space region (as, for example, when the obstacle comprises an abutment protruding from the side of a structure or building or that associated with a bridge). As an illustration, in FIG. 2 an abutment obstacle 10 is shown protruding from the side of a structure 8, such that one free space region 14a is defined, and thus, the BAT WING™ is truncated as compared with the embodiment of FIG. 1C.

The thickness T of the obstacle may impact upon the preferred placement of the BAT WING™ relative to the obstacle, with its definition-depending on the application. For example, in the case of a cylindrical obstacle as schematically shown in FIG. 1C, the thickness unit T is defined as the diameter of the cylindrical cross-section of the obstacle. In the case of an aerodynamically-shaped airfoil structure, such as a sail on a submarine, the thickness unit measure would be taken as a dimensional length ranging from between the sail nose radius and the maximum thickness dimension of the structure (e.g., the sail). In the case of a flat-nosed or sharp-nosed bridge pier, an upper boundary for the thickness unit would be about the width associated with the cross-section frontal view of the pier (e.g., taken along the windward face of the pier).

Figure 2:
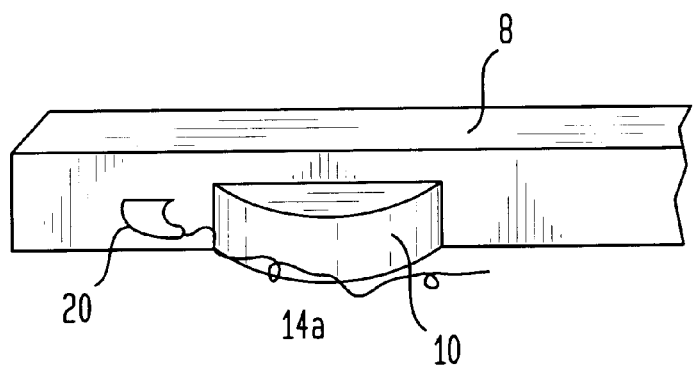
FIG. 2 schematically illustrates an alternative embodiment of the inventive method and apparatus as applied to an abutment obstacle.
Figure 3:
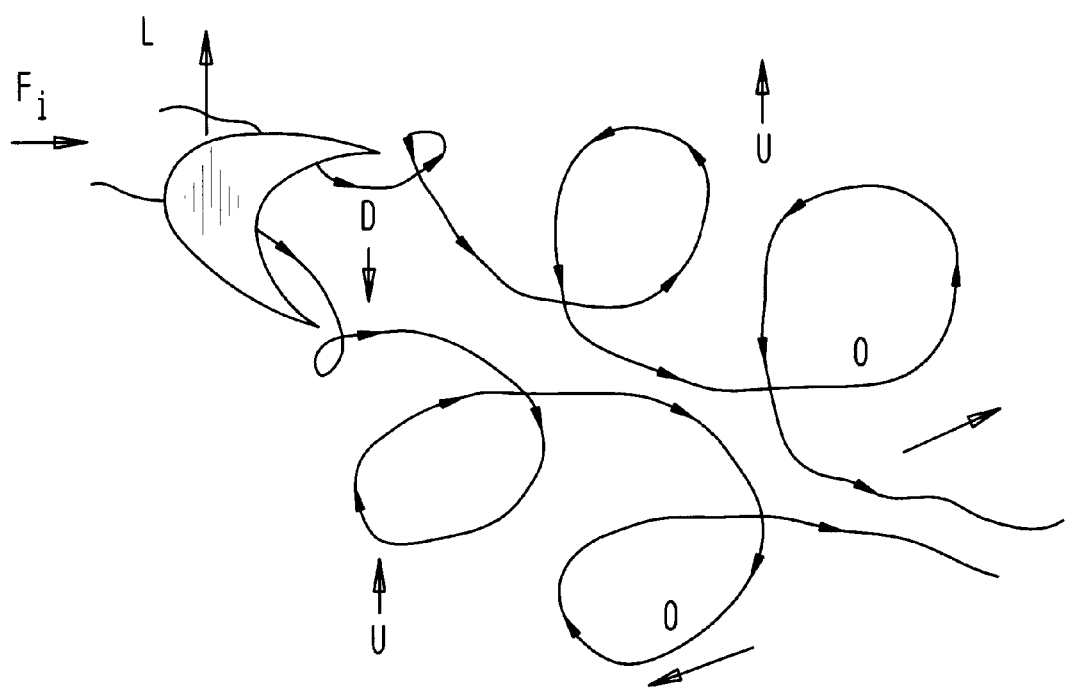
FIG. 3 schematically illustrates the effect of inventive method and apparatus on the flowfield.
Figure 4A:
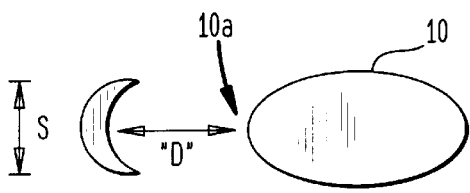
Figure 4B:
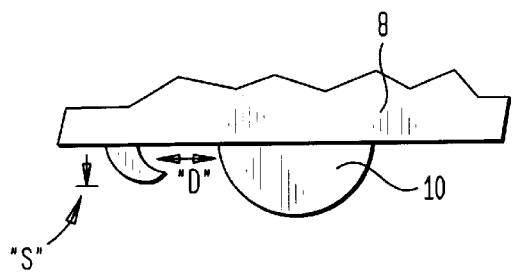
Figure 4C:
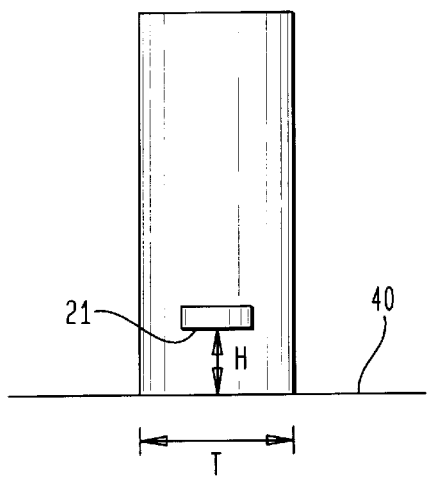
Figure 4D:
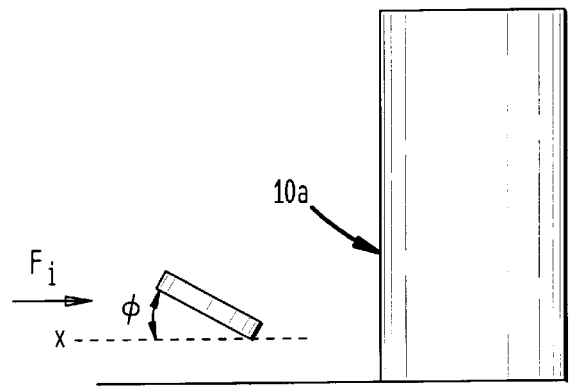
Figure 6A:
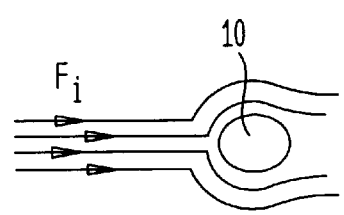
FIGS. 6A–6D show effects of the invention, wherein 6B illustrates the three-dimensional relieving effect of the invention (FIG. 6B), as compared with an unmitigated flow (FIG. 6A), with streamlines sketched in a plane parallel with the floor.
Figure 6B:
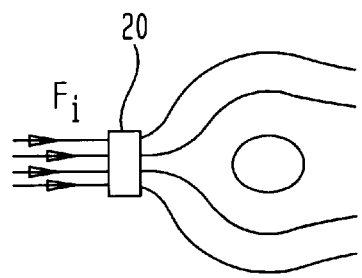
Figure 6C:
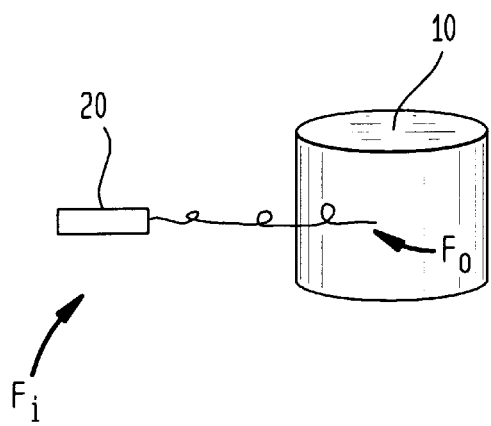
Figure 6D:
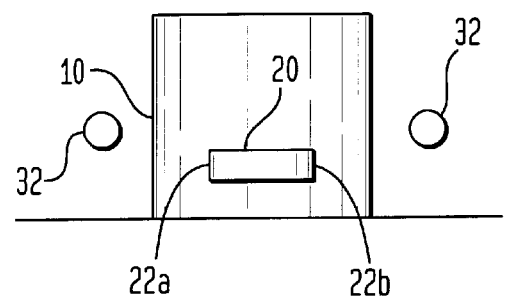

Referring still to FIG. 1C, in practicing the invention, the winged device, that is, the BAT WING,™ is provided, which comprises a lifting structure, as previously defined, and at least one end, preferably two ends or tips 22a, 22b. The BAT WING™ also has a bottom surface 21 (e.g., FIG. 4C), which should be placed a certain height "H" above the floor plane which may be small but should be sufficient to allow a flowfield to travel between the bottom surface of the BAT WING™ and the floor plane. The total effect of the lifting structure 20, by reason of its top and bottom surfaces, on the flowfield is to create a positive lift vector (e.g., FIG. 3, arrow "L"), which implies an outward flow, underneath the wing, developed toward the wing tips and near the floor plane. The bottom surface 21 is adapted to direct the incoming flowfield "$F_i$" toward the floor plane, and the lifting structure is configured to induce velocity in the flowfield, as illustrated in FIG. 3. Advantageously, the lifting structure is configured in the shape of an airfoil but other shapes may be used as well, such as rectangular, square, plate-like or block shapes, and so forth, the important consideration being that the configuration of the structure induces a positive lift vector. The BAT WING™ is placed adjacent the side of the obstacle so that when the flowfield flows towards the obstacle, as shown in FIGS. 1–3, the incoming flowfield contacts the lifting structure 20, the lifting structure directs the flowfield toward the tips (22a, 22b) and free space regions (14a, 14b), and the tips (or tip) induce velocity in the flowfield. This impact is also illustrated in FIGS. 6C–6D, showing a side and front view, respectively, of the incoming flowfield $F_i$ contacting the side of the lifting structure and being directed outward. The resulting flowfield downstream of the BAT WING™ (e.g., the outgoing flowfield "$F_o$") includes an additional tip vortex 32 generated at the ends 22a, 22b, in the free space regions 14a, 14b (e.g., FIGS. 6C–6D).

Flowfield as used herein means the flow of air, water, or any fluid that may contact an obstacle and generate a necklace vortex. The impact of the BAT WING™ on the flowfield is illustrated in FIG. 3 (which for ease of reference omits the obstacle). As can be seen, the positive lift vector implies a downwash or downwardly-directed flow towards the floor plane, illustrated at arrow "D." The downwash occurs in the region directly behind the BAT WING™ although as can be seen, an upward flow (illustrated at arrows "U"), occurs in the region beyond tips 22a, 22b. As the BAT WING™ is placed closer to the floor plane (e.g., as "H" of FIG. 1C or FIG. 4C decreases), the outward flow is enhanced, as the downwash "D" at the trailing edge or tip (22a, 22b) of the BAT WING™ is diverted outward.

Referring now to FIGS. 1C and 4A–4D, advantageously the BAT WING™ is placed a certain height "H" above the reference plane or floor plane, and a certain distance "D" (FIG. 4A), from the obstacle. The preferred placement of the BAT WING™ is defined by the distance "D" or trailing location relative to the windward nose of the obstacle 10a (FIGS. 4A, 4D), the spanwise length "S" of the BAT WING™ (FIGS. 4A–4B), the height of the bottom surface 21 of the BAT WING™ above the floor plane 40 (FIG. 4C), and the relative angle of attack φ (FIG. 4D) of the BAT WING™ to the incoming flowfield $F_i$. There is a proportional relation between the height of the lifting structure above the floor (H), and the magnitude of its lifting wake's influence.

Figure 4E:
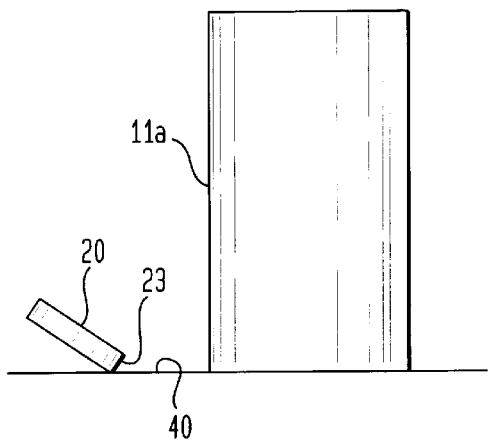
FIG. 4E reflects a side view showing an alternative placement of the inventive apparatus.
Figure 4F:
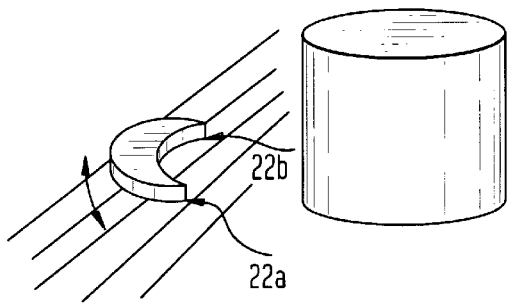

The measures H, D, and S may be related to the thickness T, although their optimal values will be application dependent. Generally, however, the distance D for placing the device in front of the obstacle 10 preferably is approximately one to two thickness units (T). The spanwise length S of the BAT WING™ lifting structure preferably is less than or equal to one thickness unit. One-half a thickness unit (T) is likely to be a satisfactory value. An optimal height H ranges from a minimal value (sufficient for allowing the flowfield to pass between the bottom surface 21 of the BAT WING™ and the floor plane 40), to a maximum value which is on the order of about two span units (S) or one thickness unit (T). The preferred height H is affected by the ground effect influence which enhances the three dimensional relieving effect of the BAT WING™. As the device is moved away from the floor plane, the effect lessons; the direct influence of the lifting structure's wake vorticity on the floor vorticity may decrease linearly with increasing height H. As shown in FIGS. 4E–4F, the structure will have a trailing edge 23 (e.g., the edge adjacent or facing the obstacle) which may touch the floor plane. All of the edge 23 may touch the floor plane 40, as in FIG. 4E, or only part of the edge, such as that part defining the tips 22a, 22b, as in FIG. 4F. In these cases, the tip vortex and outward flow (three-dimensional relieving effect), is still maintained. However, preferably the trailing edge is disposed above the floor plane so that at least a minimal flow may pass between the edge and the bottom surface (e.g., FIG. 4D).

The angle of attack φ is likely to be application dependent and will impact upon the magnitude of the wake vorticity or of the lift of the lifting structure; thus, it is related to the amount of the three-dimensional relieving effect at the windward (10a) side of the obstacle. For aircraft wing/body junctions and submarine sail/hull junctions, the BAT WING™ surface preferably is designed for an optimal lift to drag ratio, and thus, an angle φ (measured from a plane X substantially parallel to the floor plane) (see, e.g., FIG. 4D), of about less than 10 degrees would be desirable. However, for a bridge pier application, where drag is less of a concern, the preferred angle of attack φ would be higher, e.g., about twenty to thirty degrees, so as to increase the downwash underneath the BAT WING™ while retaining reasonable lifting properties and thus, more effectively utilizing the downwash's conversion to spanwise flow at the floor.

Figure 5A:
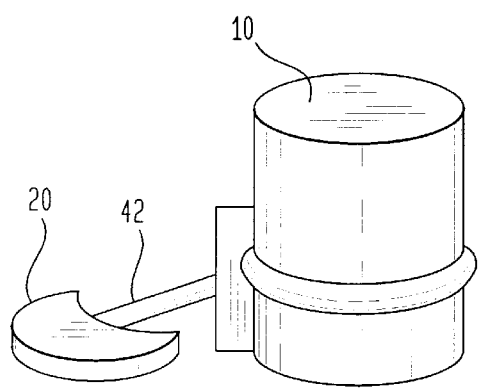
FIGS. 5A–5F reflect alternative embodiments of the inventive apparatus as applied to a bridge support, illustrating various alternative mounting devices.
Figure 5B:
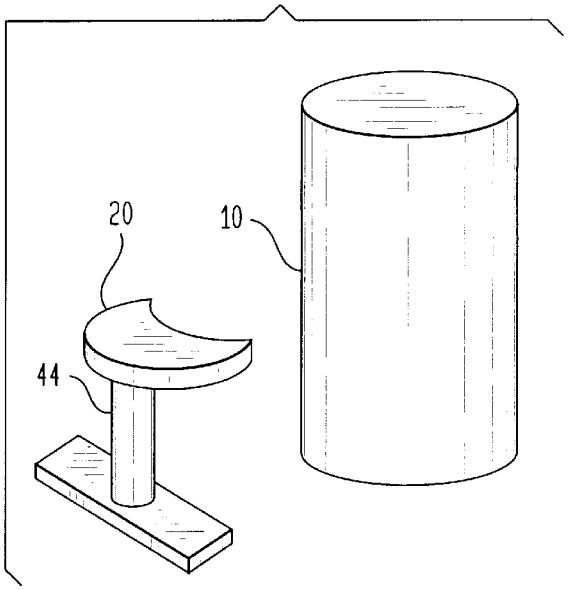
Figure 5C:
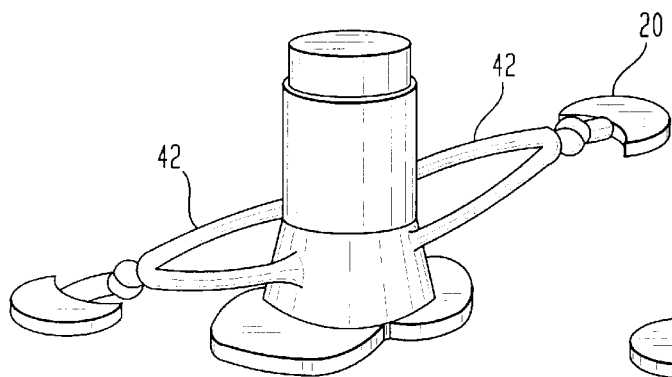
Figure 5D:
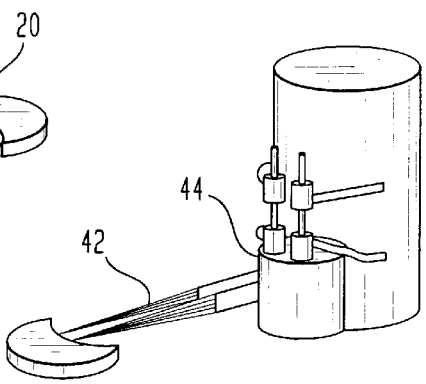
Figure 5E:
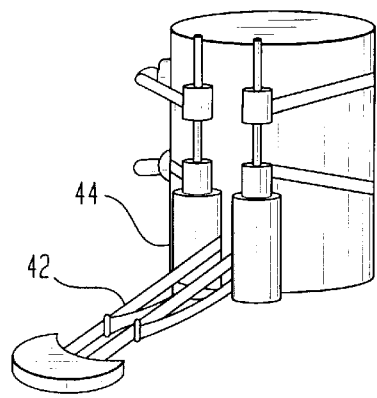
Figure 5F:
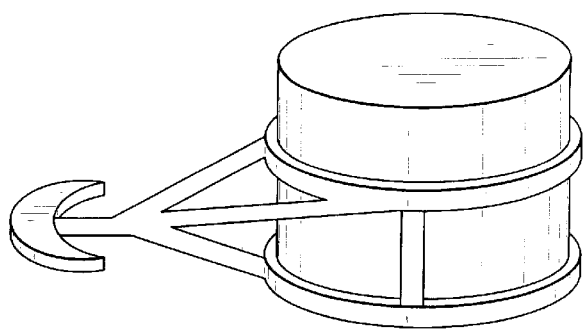

There are various approaches by which the lifting structure may be suspended above the floor plane. For example, FIGS. 5A–5F illustrate alternative embodiments of the inventive apparatus as applied to a bridge support or pier structure. FIG. 5A shows use of a strut mechanism 42 for suspending the lifting structure 20 above the reference plane, and FIG. 5B shows a base mounted system with use of a pedestal structure 44. FIGS. 5C–5F show variations of base-mounted and/or strut-mounted systems. FIG. 5C illustrates a tidal flow application where a BAT WING™ is mounted on both sides of the pier. Tidal flow changes direction periodically, back and forth at about a 180 degree change in direction, and thus, the windward side of the pier changes as well. Many tidal flows are well defined in direction and thus, basically two dominant flow directions are present. As shown in FIGS. 5D–5E, a base mount 44 may be placed next to the obstacle and then a strut mechanism 42 attached to the base mount 44, reflecting a combination of base-mounted and strut-mounted systems. When a base is placed next to the obstacle, as in FIGS. 5D–5E, it can be clamped onto the obstacle at its windward side (10a—FIG. 4A, 4D), using a claw-type design or spring-loaded clamping mechanism. A wind vane also could be incorporated into the mounting system so that the BAT WING™ could be turned into the flow direction. FIG. 5F illustrates a triangular mounting system which could be useful in distributing structural load forces efficiently.

The lifting structure mitigates the formation of the necklace vortex in at least two ways. A transverse flow is established at the bottom of the lifting structure and in the near wake; the outward flow to the tip region causes the streamlines in the floor region to have a more gradual spanwise approach at the windward side of the obstacle versus the unmitigated flow. FIGS. 6A and 6B illustrate the three-dimensional relieving effect of the invention (FIG. 6B), as compared with an unmitigated flow (FIG. 6A), with streamlines sketched in a plane parallel with the floor. This more gradual outward flow, or three-dimensional relieving effect, tends to minimize spanwise gradients, $\partial/\partial z$, and thus reduces the magnitude of the stretching (intensification) of the vorticity near the obstacle's windward nose. The second beneficial effect is the induced velocity formed from the tip vortex which is found above the floor and to the side of the obstacle (see, e.g. FIG. 1B).

Thus, with the invention, induced velocity opposes the natural tendency of the necklace vortex to roll-up and thus forces the streamlines to flow around the obstacle. The use of an upward lifting structure placed ahead of the obstacle is a counter-intuitive approach as compared to traditional insight into this phenomenon, since here, a tip vortex is introduced of the same rotational sense as that of the necklace vortex. Applicant has discovered that the intuitive notation of adding positive and negative vorticity to get zero is in some regards incorrect. With this invention, the problem has been moved away from the floor and into an upper flowfield where the tip vortex resides. This, however, is a useful result when floor erosion is a problem or the necklace vortex is desired to be moved out of the path of a propeller system.

The inventive method for junction flow mitigation of the necklace vortex comprises: (1) creating an outward flow near the reference plane (e.g., toward the lifting structure tip region) and therefore reducing the stretching, and intensification, of wall vorticity at the windward nose region of the obstacle; and (2) inducing velocity in the flowfield above the reference plane and to the side of the obstacle (e.g., resulting from the tip vortex). This induced velocity tends to counter-act the natural tendency of the necklace vortex to roll-up. An additional feature comprises far-wake interactions between the tip vortex and boundary layer vorticity. This can cause rapid breakup of the coherent vortex structures in the far downstream region.

The discussion below is divided in three sections, describing (1) principles of physics relating to the invention, including aerodynamic lifting surfaces and their wakes; (2) exemplary applications for the invention; and (3) a computational simulation of the invention.

Principles of Physics

The principles of physics pertaining to the application of the invention to the mitigation of the necklace vortex has its conceptual roots in underlying principles of vorticity dynamics, three-dimensional separated wall bounded flows, and the aerodynamic principles of lifting body wake flows. The invention involves flow control and mitigates the formation of the necklace vortex in junction flows. Its application has wide spread use in a variety of hydrodynamic applications, including those discussed above in the Background Section. Applicant has discovered that previous attempts at necklace vortex mitigation (dillets, fillets, ramps, strakes, riprapping, stacked washers, vertical guide vanes, etc.), have either originated from the proposer's intuition or were based on incorrect reasoning as to the dominant mechanism responsible for the formation of the necklace vortex.

Here, we first review the concepts of vorticity, vorticity dynamics, and wall bounded separated flows. We then discuss the physics behind lifting body wake flows and finally combine the two physical phenomenon into a viable mechanism for necklace vortex mitigation in junction flows.

Vorticity Dynamics and Separated Flows

The vorticity vector, ω, is defined as the curl of the velocity field, ∇×v, and is important to understanding fluid dynamics and to an artisan practicing fluid dynamics, see Panton (cited above). In the case where inertial forces dominate viscous diffusion effects, vorticity can be used as an intuitive measure of the fluid dynamic behavior. A non-dimensional measure of inertial to viscous effects is the Reynolds number, $$R_e = \frac{UL}{v},$$

where U is the velocity scale, L, is the length scale, and v is the kinematic viscosity for the flow. Thus, for cases where the inertial forces dominate over the viscous, the Reynolds number will be large; for applications discussed above, it is not uncommon for this measure to be on the order of $10^6$ or higher. The vorticity transport equation is, $$D/Dt(\omega) = \omega \cdot \nabla v + 1/R_e(\nabla^2 \omega), \qquad (1)$$

where $$\frac{D}{Dt} = \frac{\partial}{\partial t}() + v \cdot \nabla().$$

The vorticity transport equation is independent of pressure and therefore in many circumstances, one can construct idealized flow physics through the induced velocity generated by vorticity filaments. A vorticity filament is a line of vorticity on which the vorticity magnitude can vary. A vorticity filament has a rotational sense of velocity around its core which will induce a velocity component perpendicular to its radial vector. This induced velocity magnitude at a point in space is proportional to the inverse of the distance away from the filament. An actual flowfield can be thought of as many of such filaments of different strengths which are in constant interaction. From a conceptual view point, vorticity will interact, filaments will entwine, and induced velocity is additive, but placing positive and negative regions of vorticity, or vortex filaments, close to one another do not cause cancellation. Rather, the interaction can cause highly complicated flowfields through their entwinement, and only the much slower effect of viscous diffusion will limit, or stabilize, their interaction.

In considering the necklace vortex at junction flows, the first term on the right hand side of Eq. (1), ω·∇v, is important. This term (referred to herein as $V_f$) tells us how a vortex filament can be stretched and tilted. Stretching a vortex filament will increase its magnitude, while tilting the vortex filament will simply change the vector's direction without changing its magnitude. In strictly two-dimensional flows, $V_f$ is zero. General theorems can be formulated with regards to vortex filaments; namely, vortex lines must either extend to infinity, close on themselves, or end at walls. Although the pressure does not enter into the vorticity transport equation, Eq. (1), its connection can be found at the surface of wall bounded flows where the vorticity flux at the surface, σ, can be related to the pressure gradient, $$\frac{\partial p}{\partial x} = \mu \sigma_z$$

$$\frac{\partial p}{\partial z} = \mu \sigma_x$$

$$\sigma_y = \frac{\partial \omega_x}{\partial x} + \frac{\partial \omega_z}{\partial z}$$

where p is the pressure, μ is the absolute viscosity, and y is the direction normal to the surface.

We are now ready to address some issues of wall bounded flow separation. We define two types of separation: the first being two-dimensional type separations, and the second being highly three-dimensional type separations. The two-dimensional type separations are flows that are dominated by an adverse pressure gradient on the surface and thus a dominant vorticity flux from the wall. As the flow experiences this adverse pressure gradient, the wall vorticity, and shear stress, diminishes. As the shear stress goes to zero, the flow can abruptly change direction and thus there is a separation of surface streamlines. These types of separations are found on two-dimensional airfoils, finite wings, and flows over cylinders and spheres.

Figure 7:
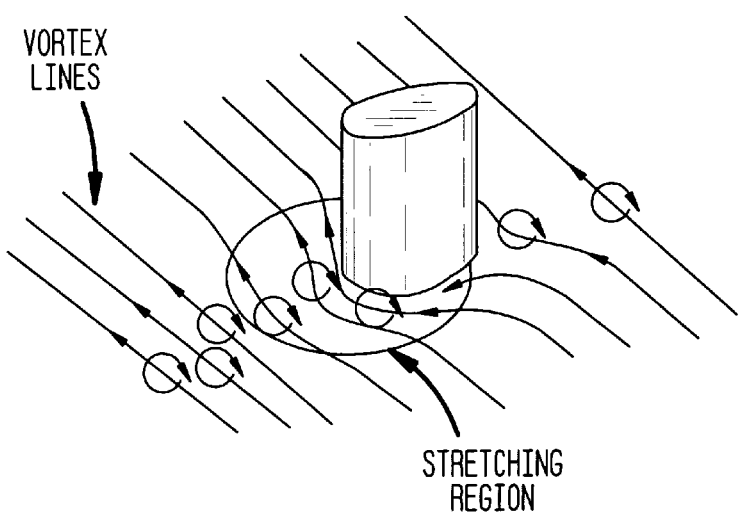
FIG. 7 illustrates stretching and tilting of the incoming two-dimensional boundary layer vorticity.

As noted above, in two dimensional flows the vorticity stretching and tilting is zero; therefore, for highly three-dimensional flows the addition of the intensification of wall vorticity by stretching can play a dominant role and lead to a surface flow separation as well. Applicant has discovered that this type of separation, where stretching is the dominant mechanism, is that associated with the formation of the necklace vortex at junction flows. FIG. 7 illustrates the stretching and tilting mechanism associated with the incoming boundary layer vorticity. For high Reynolds number flows, nearly all the boundary layer vorticity, $$\omega_z = -\frac{\partial v_x}{\partial y}$$

for solely two-dimensional incoming flows, is found in the bottom 20% of the layer and the direction of the vorticity vector is parallel to the surface. The term responsible for the vortex stretching (intensification) at the windward nose region of the obstacle is $$\omega_z \frac{\partial v_z}{\partial z};$$

therefore, modest gradients of spanwise(z) velocity close to the wall can induce large amounts of vorticity intensification.

Applicant has discovered that relieving the spanwise gradients of the flowfield, and thus reducing the amount of vorticity stretching, can mitigate the necklace vortex. The various mechanisms of stretching, tilting, viscous diffusion, and adverse pressure gradients each play a role in the formation of the necklace vortex. However, applicant has found that by taking the stretching mechanism as the dominant effect and exploiting this fact, a very effective mitigation strategy is achieved. Previous efforts to mitigate the formation of the necklace vortex have considered the effect of pressure gradient as dominant and have attempted to modify surface shapes to reduce its effect; e.g. with use of strakes, fillets, and dillets. These strategies have produced modest but not dramatic results, although in these cases even the modest success could be attributed to a three-dimensional relieving effect on vortex stretching.

Aerodyamic Lifting Surfaces and Their Wakes

The fundamental principle of lifting surface wake flows was described by Ludwig Prantdl and his colleagues (1912–1918). Prantdl's lifting line theory used a series of horseshoe vortices to model the circulation distribution on a lifting finite span wing. Applicant has discovered that these horseshoe vortex filaments are not the same as the junction flow necklace vortex discussed above, and that the necklace vortex is in reality not a true horseshoe vortex as defined by Prantdl and has a completely different vorticity distribution. Prantdl modeled the wake as a vortex sheet and was able to predict downwash velocity and associated induced drag effects from his theory. The vortex sheet provides a good engineering model for the roll-up of the lifting body wake flow known as the tip vortex. The roll-up of the tip vortex is the result of the vortex sheet's natural instability, and the resultant tip vortex tends to be well modeled as a vortex filament-type structure with a core region of vorticity. Of particular importance is the flowfield on the top and bottom surface of the wing and in the near wake; the flow under the wing, for an upward lifting structure, tends to curve towards the tip region during the roll-up process. The outward spreading of the lower surface flow is an advantageous feature when placed ahead of the windward side of the obstacle where the necklace vortex is formed.

Exemplary Applications

The inventive method and apparatus can be applied in various circumstances, with some exemplary applications described below.

Bridge Pier Erosion

The invention can mitigate the necklace vortex and thus the cause of bridge local scour, and it may also reverse existing scouring at bridges and bridge-like piers and supports.

The invention mitigates the formation of the necklace vortex and thus the cause of the scouring. Implementation is minimal compared to other solutions suggested in the past. The BAT WING™ can be attached by a strut mechanism to the bridge pier or mounted on a weighted base (or driven pile) and placed forward of the windward side of the pier, and thus, no modification to the bridge or pier would be needed. See FIGS. 5A–5F. In the case of bridges where the riverbed already has a scour hole around the pier, the BAT WING™ could be placed near the hole edge to cause a self-healing effect, e.g., refilling the hole. By mitigating the cause of the erosion-at currently scoured damaged bridges, the natural riverbed shear stress and sediment in the river will drag or deposit sediment into an existing scour hole and naturally fill it in. Thus, the BAT WING™ can correct and mitigate scouring damage from periodic floods, tidal flows, or sustained stream flows.

Submarine Flowfields

Figure 8:
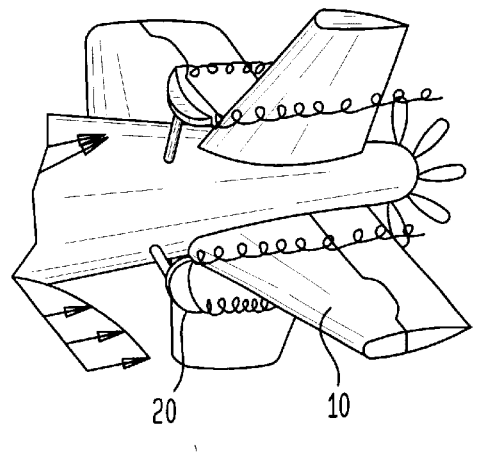
FIG. 8 illustrates an application of the invention to mitigate submarine vortex flows.

Applying the BAT WING™ ahead of the nose of control surfaces and above the hull surface can mitigate the formation of the necklace vortex and thus reduce the acoustic signature of submarine operations. To illustrate, an exemplary placement of the inventive apparatus on a submarine is shown in FIG. 8, with the BAT WING™ positioned in front of the submarine sail 10. The apparatus can be flush mounted for standard operations and deployed upward way from the hull surface for quiet operations; this will reduce potential visual security compromise of the device during surface operations. Many of the surface shaping methods for the bridge pier erosion case (discussed above) apply to the submarine application as well.

Architectural Aerodynamics

The invention may be applied to the exterior design of a building or obstacle in various ways to provide many solutions, e.g., to wind gust problems discussed previously. For example, the inventive apparatus may be embodied as an aerodynamically shaped roof of a shelter placed ahead of the windward face of the obstacle, or it may embrace a sculpture which has an aerodynamically shape feature that produces upward lift and the appropriate aerodynamic flow. An exemplary apparatus for an architectural application (e.g., reflecting a sculpture) is schematically illustrated in FIG. 5B.

Large Scale Geological Flows

Figure 9:
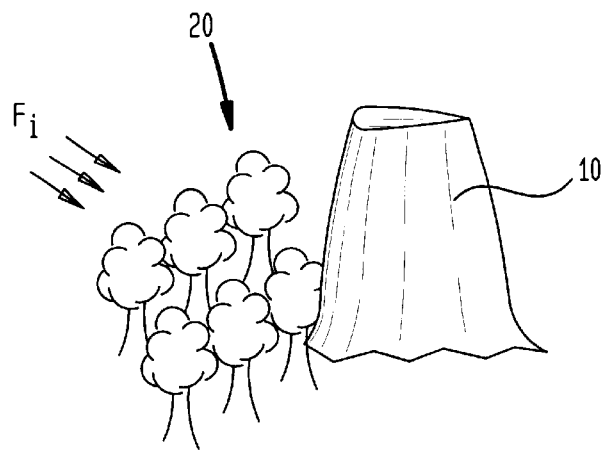
FIG. 9 illustrates one embodiment of the inventive method and apparatus to a geological structure comprising a mountain.

The BAT WING™ may be applied to solve problems associated with geological flows. The BAT WING™ could be incorporated as part of the design of a large building or structure that has a roof with the desired aerodynamics properties placed in front of the geological obstacle being protected. Alternatively, the BAT WING™ could be incorporated as vegetation at the windward side of the obstacle. For example, trees with a well founded root system and a combined leaf system could be shaped like an aerodynamic lifting structure. The flowfield produced from the combined tree tops will create a mitigating effect at the base of the windward face of the obstacle and prevent large amounts of upper atmosphere air from reaching the ground. An exemplary embodiment for a geological application of the invention is illustrated in FIG. 9, showing the BAT WING™ in the form of tree tops 20 placed ahead of a geological structure 10 relative to the flowfield $F_i$.

Figure 10:
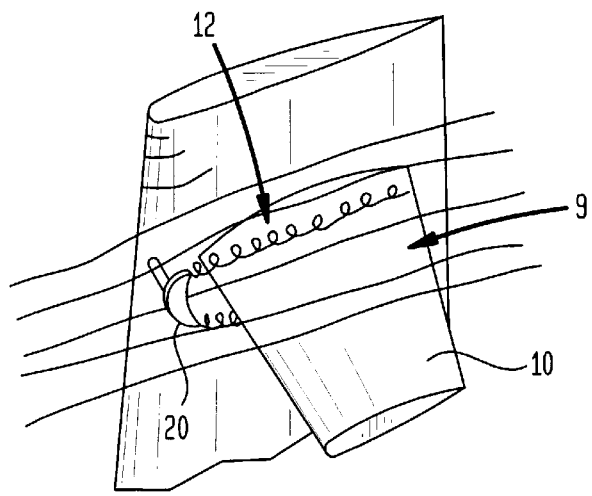
FIG. 10 illustrates one embodiment of the inventive method and apparatus as applied to an aircraft; and It is to be understood that these drawings are for the purposes of illustrating the concepts of the invention, are not limiting in nature, and are not to scale. The same character references are used to denote corresponding features throughout the figures.

Aircraft Wing/Body Junctions, Inlet Struts, Rotor and Stator Blade Junctions Various types of mitigation strategies for necklace vortex formation on aerodynamic and other shaped appendages emanating from a surface already have been discussed. An exemplary embodiment for an aircraft application of the invention is illustrated in FIG. 10, showing the BAT WING™ 20 placed in front of a wing or body 10 of an aircraft. The circumstances are conceptually similar to a pier junction with a riverbed or a control surface attached to the hull of the submarine, discussed above. Also, one noted application is in low Reynolds number junction flows, or micro-adaptive flow control devices. The influence of junction flows at low Reynold's numbers can cause large amounts of separated flow over an extended region of the aerodynamic surface. The induced effect of the BAT WING™ tip vortex 12 over the control surface 9 will mitigate root separation under high lift and cruise conditions.

The design, implementation, and physical principles of lifting aerodynamic surfaces is a mature area of engineering. See A. M. Kuethe and C. Y. Chow, FOUNDATIONS OF AERODYNAMICS (Wiley, 4th ed., 1986), and J. D. Anderson, FUNDAMENTALS OF AERODYNAMICS (McGraw Hill, 1984), incorporated herein by reference. Many types of wing designs exist. BAT WING™ lifting structures, as applied to aerodynamic surfaces, can be designed such that they are optimized for high lift, using leading edge slats and trailing edge flaps, or low drag by exotic airfoil shapes. In aircraft applications, the wing shape and performance is adaptively changed by the active movement of leading edge slats and trailing edge flaps to adjust performance characteristics for the various flight conditions associated with takeoff, landing, and cruise. Such adjustments may be incorporated in the BAT WING™ lifting structure for enhancing performance. The shape of the wing platforms can be tapered in or out towards the tip. Swept wings are also contemplated and will reduce effects of variable incoming airflows. All these types of lifting structures are contemplated as within the scope of the invention, the optimal design depending upon the particular circumstance.

To a large degree all the applications and various configurations for using the invention can be applied in each circumstance where the necklace vortex is present. For example, the use of wing-shaped contoured tree tops could prove effective in architectural circumstances.

Computational Simulations

The governing equations of fluid flow are the Navier-Stokes equations, here stated for the assumption of low Mach number where the incompressibility condition applies;

$$\frac{D}{Dt}v = -\nabla p + \frac{1}{R_e}\nabla^2 v. \qquad (2)$$

Here $$\frac{D}{Dt}v = \frac{\partial}{\partial t}v + v \cdot \nabla v,$$

v is the fluid velocity in a three-dimensional space, p is the pressure, $R_e$ is the Reynolds number (ratio of inertial to viscous effects), and the velocity must satisfy the incompressibility constraint $\nabla \cdot v = 0$. Over the last few decades, hundreds of millions of dollars have been spent on research to find reliable ways to solve these equations and thus help understand the physical mechanisms of fluid flow, as well as provide predictive capabilities for assisting in engineering designs. Much progress has been made but computational methods still require large and expensive computer resources and considerable insight to interpret the results. An alternative to solving the Navier-Stokes equations is a formulation of the velocity field contributed to Helmholtz, $$v = \nabla \phi + v_w \qquad (3)$$

$$v_w(r) = -\frac{1}{4\pi}\int_\Omega \frac{r' \times \overset{\rho}{\omega}(r')}{|r-r'|^3}dr', \qquad (4)$$

where $\phi$ is a velocity potential used to enforce boundary conditions, and r is a distance vector between two points in a three-dimensional space. The Helmholtz decomposition is the basis of computational methods known as vortex methods and are particularly useful when a known distribution of vorticity is given and the evolution of the flowfield is desired as a function of time.

It is understood that the embodiments described herein are merely exemplary and that a person skilled in the art may make variations and modifications without departing from the spirit and scope of the invention.

I claim:

1. A method for mitigating the effect of the necklace vortex on an obstacle projecting above a floor plane, the obstacle having a windward side facing the direction of a flowfield and a thickness defining at least one free space region beyond the thickness, the method comprising:

providing a winged device comprising a lifting structure, the lifting structure having a bottom surface and a spanwise width terminating in at least one tip and being configured to induce a positive lift in a flowfield contacting the lifting structure; and disposing the winged device a distance in front of the windward side of the obstacle relative to the flowfield to define a placement distance with the bottom surface above the floor plane and the spanwise width of the lifting structure aligned along the thickness of the obstacle so that the at least one tip is directed toward the at least one free end, wherein when the flowfield flows towards the obstacle, the flowfield contacts the lifting structure which directs the flowfield toward the at least one tip, the spanwise width and the placement distance being sufficiently large that the winged device spreads the flowfield away from the center of the obstacle to the at least one free space region to thereby mitigate the effect of the necklace vortex.

2. The method of claim 1, wherein the winged device is placed with the bottom surface above the floor plane by a sufficient distance to allow the flowfield to travel between the bottom surface and the floor plane.

3. The method of claim 1 in which the winged device is placed above the floor plane to define a height between the bottom surface of the lifting structure and the floor plane, wherein the height falls within the range of (i) a minimum value sufficient to allow the flowfield to travel between the bottom surface and the floor plane; and (ii) a maximum value approximately equal to the thickness of the obstacle.

4. The method of claim 1, wherein the thickness of the obstacle defines one free space region and the winged device has one tip, the lifting structure having a surface for directing the flowfield toward the one tip and the one free space region, the tip being configured to induce velocity in the flowfield.

5. The method of claim 1, in which the thickness of the obstacle defines two free space regions and the winged device has two tips, the lifting structure having a surface for directing the flowfield outward toward the two tips and the two free space regions, the two tips defining two ends for inducing velocity in the flowfield.

6. The method of claim 5 in which the obstacle comprises an aircraft wing protruding outwardly from the body of an aircraft, the aircraft wing having a wing span to define its length from the body and a nose width that defines its thickness at approximately the junction of the aircraft wing and the aircraft body, wherein the thickness of the obstacle is defined by the nose width of the aircraft wing and the spanwise width of the lifting structure is aligned along the nose width, substantially perpendicular to the length of the aircraft wing, so that the lifting structure directs the flowfield outward away from the nose width of the aircraft wing.

7. The method of claim 1 in which the obstacle comprises a building or a geological structure.

8. The method of claim 1 in which the lifting structure has an airfoil shape.

9. The method of claim 1 in which the thickness of the obstacle defines a thickness unit and the placement distance ranges from approximately one to two thickness units.

10. The method of claim 9, wherein the spanwise width ranges from less than or equal to about one thickness unit.

11. The method of claim 10, in which the obstacle is selected from a projection from an aircraft or a submarine, the thickness unit being defined by the nose width of the projection adjacent its juncture with the aircraft or submarine, and the winged device is disposed so that the windward side of the winged device is tilted upward at an angle of about less than ten degrees relative to a plane running substantially parallel to the floor plane.

12. The method of claim 1, in which the obstacle comprises a body of an aircraft and the winged device mitigates root separation over the surface of the aircraft body.

13. A method for mitigating the effect of the necklace vortex on an obstacle projecting above a floor plane, the obstacle having a windward side and a thickness defining at least one free space region beyond the thickness, the method comprising:

providing a winged device comprising at least one tip and a lifting structure, the lifting structure configured to induce a positive lift in a flowfield contacting the structure and including a bottom surface; and disposing the winged device adjacent the windward side of the obstacle and with the bottom surface above the floor plane so that when the flowfield flows towards the obstacle, the flowfield contacts the lifting structure which directs the flowfield away from the center of the obstacle and toward the at least one tip and the at least one free space region, in which the lifting structure has a trailing edge disposed facing the obstacle with at least part of the trailing edge touching the floor plane.

14. The method of claim 13, in which the winged device is disposed so that the windward side of the winged device is tilted upward at an angle of about twenty to thirty degrees relative to a plane running substantially parallel to the floor plane.

15. A method for mitigating the effect of the necklace vortex on an obstacle projecting above a floor plane, the obstacle having a windward side and a thickness defining at least one free space region beyond the thickness, the method comprising:

providing a winged device comprising at least one tip and a lifting structure, the lifting structure configured to induce a positive lift in a flowfield contacting the structure and including a bottom surface; and disposing the winged device adjacent the windward side of the obstacle and with the bottom surface above the floor plane so that when the flowfield flows towards the obstacle, the flowfield contacts the lifting structure which directs the flowfield away from the center of the obstacle and toward the at least one tip and the at least one free space region, in which the obstacle is a support or foundation to a bridge or pier.

16. An apparatus for mitigating the effect of the necklace vortex on a foundational member of a bridge or pier, the foundational member having a thickness defining at least one free space region beyond the thickness, the apparatus comprising:

a winged device comprising at least one tip and a lifting structure, the lifting structure configured to induce a positive lift in a flowfield contacting the structure and having a spanwise width and a bottom surface, wherein the winged device is adapted so that when it is disposed adjacent the windward side of the foundational member with its bottom surface above the floor plane, a flowfield upon contacting the winged device is directed away from the center of the foundational member, downwardly toward the floor plane, and along the spanwise width toward the at least one tip which induces velocity in the flowfield and directs the flowfield away from the center of the foundational member to mitigate the effect of the necklace vortex.

17. The apparatus of claim 16, further comprising a support for suspending the winged device above the floor plane.

18. The apparatus of claim 17, in which the support comprises a base-mounted support system.

19. The apparatus of claim 17, in which the support comprises a strut coupled to the obstacle to define a strut-mounted support system.

20. The apparatus of claim 19, in which the strut has a cantilever or triangular configuration.

21. An apparatus for mitigating the effect of the necklace vortex on an obstacle, the obstacle having a thickness defining at least one free space region beyond the thickness, the apparatus comprising:

a winged device comprising a lifting structure, the lifting structure having a bottom surface and a spanwise width terminating in at least one tip and being configured to induce a positive lift in a flowfield contacting the lifting structure, wherein when the winged device is disposed adjacent the windward side of the obstacle with its bottom surface above the floor plane, a flowfield upon contacting the winged device is directed away from the center of the obstacle, downwardly toward the floor plane, and toward the at least one tip which induces velocity in the flowfield, wherein the spanwise width of the winged device is so dimensioned relative to the thickness of the obstacle that the flowfield is directed outward along the spanwise width and away from the center of the obstacle to the at least one free space region to thereby mitigate the effect of the necklace vortex.

* * * * *